(12) United States Patent
Volkov et al.

(10) Patent No.: US 10,783,136 B1
(45) Date of Patent: Sep. 22, 2020

(54) MANAGEMENT OF GARBAGE DATA IN DISTRIBUTED SYSTEMS

(71) Applicant: Parallels International GmbH, Schaffhausen (CH)

(72) Inventors: Oleg Volkov, Moscow (RU); Alexey Kobets, Seattle, WA (US); Andrey Zaytsev, Moscow (RU); Kirill Korotaev, Moscow (RU); Ludmila Ivanichkina, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 648 days.

(21) Appl. No.: 15/445,858

(22) Filed: Feb. 28, 2017

(51) Int. Cl.
*G06F 16/23* (2019.01)
*G06F 3/06* (2006.01)

(52) U.S. Cl.
CPC ........ *G06F 16/2365* (2019.01); *G06F 3/0604* (2013.01); *G06F 3/067* (2013.01); *G06F 3/0644* (2013.01); *G06F 3/0647* (2013.01); *G06F 3/0652* (2013.01)

(58) Field of Classification Search
CPC .. G06F 16/2365; G06F 3/0604; G06F 3/0644; G06F 3/0647; G06F 3/0652; G06F 3/067
See application file for complete search history.

(56) References Cited

U.S. PATENT DOCUMENTS

| | | | | |
|---|---|---|---|---|
| 6,411,954 B1* | 6/2002 | Roffe | | G06F 9/466 |
| 6,772,296 B1* | 8/2004 | Mathiske | | G06F 12/08 |
| | | | | 365/185.11 |
| 7,269,608 B2* | 9/2007 | Wong | | G06F 11/1435 |
| 8,601,206 B1* | 12/2013 | Shapiro | | G06F 3/0688 |
| | | | | 711/105 |
| 8,756,193 B2* | 6/2014 | Rudwick, III | | G06F 9/4493 |
| | | | | 707/626 |
| 9,342,411 B2* | 5/2016 | Belluomini | | G06F 12/0808 |
| 9,348,831 B1* | 5/2016 | McCline | | G06F 16/22 |
| 9,787,773 B2* | 10/2017 | Shapiro | | G06F 3/067 |
| 2003/0093645 A1* | 5/2003 | Wong | | G06F 12/0864 |
| | | | | 711/216 |
| 2014/0279929 A1* | 9/2014 | Gupta | | G06F 11/1471 |
| | | | | 707/683 |
| 2015/0149870 A1* | 5/2015 | Kozat | | G06F 11/1096 |
| | | | | 714/772 |
| 2015/0309874 A1* | 10/2015 | Liang | | G06F 11/1076 |
| | | | | 714/766 |

(Continued)

*Primary Examiner* — Huawen A Peng
(74) *Attorney, Agent, or Firm* — Bardmesser Law Group

(57) ABSTRACT

Method for writing objects into an object storage. Performing, on a protocol end point: receiving a client request for inserting an object into the object storage, wherein the object has a name and object data; generating a unique ID (UID) for the object; sending, to a name server (NS), a request for creating a guard entry (GE). The GE has a lifetime that defines when the name-object pair is inserted into the object storage. A request to an object server (OS) atomically creates a Garbage Collection Entry and assigns space for the object data. The GCE has a lifetime that defines when the object data is inserted into the object storage; sending, to the OS, object data for writing to storage; sending, to the NS, a request for writing the name; and sending response to the client, to report success after requests to the NS and the OS are successful.

18 Claims, 14 Drawing Sheets

(56) References Cited

U.S. PATENT DOCUMENTS

2016/0191509 A1* 6/2016 Bestler ................ G06F 16/2255
713/163
2017/0091215 A1* 3/2017 Beard ................... G06F 16/184

* cited by examiner

MANAGEMENT OF GARBAGE DATA IN DISTRIBUTED SYSTEMS

BACKGROUND OF THE INVENTION

Field of the Invention

This invention relates to a method and system for distributed key-value (object) storage providing for required properties of durability, eventual consistency and atomicity and, more particularly, to a method and system for managing garbage data in distributed key-value storage systems.

Description of the Related Art

A modern trend of using cloud storages for storing key-value data presents some challenges. Key-value storages (or object storages) are a popular underlying storage solution for modern cloud services, such as e-mail, on-line trading or social media services. They allow users to associate arbitrary data with some arbitrary textual name (the key). For the sake of load balancing, a common practice is to split such a system into multiple parts hosted on different servers. Such distributed key-value storage consists of at least three major components as shown in FIG. 1. These components are a client 130, a name server (NS) 110 and an object server 120.

The NS 110 stores object names or keys while the object server 120 stores object data. A client 130 accesses both the NS 110 and the object server 120. When attempting to save an object, the client 130 provides the system with a name-object pair and sends a request to create a name to NS 110 and a request to create a corresponding object data to the object server 120. Should the client crash when creating either a name or an object data, some garbage data may be accumulated, because of corrupted data left over from these failed operations (e.g., a data without an object, or an object and its data without a name). From the client's point of view, to improve the process of object creation in the system, the storage system must support the following properties:

1. Durability. Once created, the key-value pair should continue to exist until it is explicitly deleted. In conventional systems, failed object creation can corrupt the existing value pair.

2. Eventual consistency. The key-value creation should either succeed entirely or fail completely. Thus, eventually, the partial creation results, like a name without data or data without a name, should not be present. Note that this can happen as a result of incomplete (failed or interrupted) object creation operations.

3. Atomicity. In case the name to be created matches an existing name, the latter should be replaced atomically. This means that should the creation of the new name fail in any way, the old name should be kept intact. Besides, once the new name becomes visible to the client, the object should be in the consistent state. So from the client's point of view, the system turns from one consistent state to another atomically. Note that if the creation of the new name fails, the old name should be kept unchanged. This is not always provided by the conventional object creation processes.

The first property is the easiest to implement by committing names and objects to the stable storage. The second property may be enforced by special garbage collection routine—i.e., dropping partial creation results automatically. Garbage collection is a form of automatic memory management, which attempts to reclaim garbage memory area, or memory occupied by objects that are no longer in use. The third of the above properties requires a careful ordering of updates, so the name creation becomes the last stage of the algorithm, so after that the operation is guaranteed to be successful. However, there are no existing distributed systems that guarantee implementation of the above properties.

Designing distributed system satisfying the above properties is a challenge, since there is no guarantee of atomicity of any operation across individual servers' site boundaries. So atomic operations on all sites to create a virtually atomic sequence of updates should be carefully combined.

Accordingly, a distributed key-value (object) storage, which provides for the above properties, is desired.

SUMMARY OF THE INVENTION

The invention relates to a method and system for distributed key-value (object) storage providing for required properties of durability, eventual consistency and atomicity, that substantially overcomes one or more disadvantages of the related art.

The Distributed Storage concept relies on a Name Server and Object Server storing objects names and data, respectively. The algorithm for creating objects in response to a Client's request is as follows:

0. The Protocol End Point (EP) gets a request from the Client.

1. On the Name Server, EP makes a guard entry (GE) and sets its TTL (time to live, or finite lifetime).

2. The EP requests the Object Server to create the object and make a garbage collection entry (GCE) with a corresponding TTL and write them to the persistent storage.

3. The EP writes the object data on the Object Server.

While executing steps 2 and 3, the reference to the object is stored in an Active Objects Table (AOT).

4. On the Name Server, the EP inserts the object name and removes GE in single atomic action provided that GE still exists.

5. The EP notifies the Client about the request completion.

When the GE TTL expires, the object is checked in the AOT. If the object is in the AOT, its TTL is extended. Otherwise, the GE is deleted.

When the GCE TTL expires, the object is checked in AOT. If the object is in AOT, its TTL is extended. Otherwise, the Name Server gets a query whether the test name exists. If the name exists, GCE is erased. Otherwise the GCE and the object are erased from the Object Server.

In case the Name Server is receiving a query from the Object Server to test a name's existence, and the name does not exist, the corresponding GE is being deleted before sending response to the Object Server.

The algorithm described above works when the system is stable. Let us assume that the system is unstable:

If a client crashed before name creation, the object and the data will be ultimately deleted from Object Server upon the GCE TTL expiration.

If the Name Server fails during object creation, the EP will find no GE on the Name Server in step 4 and it will restart the operation from step 1.

If the Object Server fails during steps 2 or 3, the client will restart object creation from step 2.

In an exemplary embodiment, a method for writing objects into an object storage, includes, on a protocol end point—receiving a client request for inserting an object into the object storage, wherein the object has an object name and object data; generating a unique ID (UID) for the object; sending, to a name server, a request for creating a guard entry (GE) in a non-persistent storage, wherein the request includes the object name and the UID, wherein the GE has a GE finite lifetime that defines the time during which the name-object pair with the UID should be consistently inserted into the object storage; sending to an object server a request for creating a Garbage Collection Entry (GCE) in a persistent storage and for assigning space for the object data in the persistent storage in the same atomic operation, wherein the GCE has a GCE finite lifetime that defines a time during which the object data should be inserted into the object storage; sending, to the object server, the object data with a request for writing the object data to the persistent storage; sending, to the name server, a request for writing the object name into the persistent storage; and sending a response to the client, to report a successful object creation when all the requests to the name server and the object server were successful.

Optionally, the object storage is a distributed key-value storage. Optionally, the object names and the object data are stored on different servers, wherein the name server stores the object names and the object server stores the object data. Optionally, the request for writing the object data to the persistent storage includes checking for existence of the object and writing the object data when the object exists. Optionally, upon a request from the endpoint for writing the object name into the persistent storage, the name server checks for existence of the GE and when the GE exists, the name server writes the object name into the persistent storage and deletes the GE, all in the same atomic operation.

Optionally, the method further includes sending a request to the object server to delete the GCE upon successful creation of the object name. Optionally, the sending of the response to the client includes, when the object does not exist on the object server during the writing or when the GE does not exist on the name server during the name creation, a notification of failure to create the object.

Optionally, the method further includes, when the GE finite lifetime reaches zero, deleting the GE from the name server. Optionally, when the GCE finite lifetime reaches zero, the object server executes a garbage collection routine (GCR) comprising sending a request to the name server to test existence of the object name, and deleting the GCE when the object name exists, otherwise, when the object name does not exist on the name server, removing the GCE and the object data in the same atomic operation. Optionally, when the object name does not exist on the name server, the GE is deleted from the name server upon sending the response to the object server request that checks for the existence of the object name.

Optionally, the method further includes checking whether the UID is in an Active Object Table upon expiration of the GE finite lifetime and either extending the GE lifetime when the UID is found in the Active Object Table, or dropping the GE when the UID is not found in the Active Object Table. Optionally, the Active Object Table represents a set of objects that have been recently written on the object server. Optionally, the method further includes checking whether the UID is in the Active Object Table upon expiration of the GCE finite lifetime, and either extending the GCE finite lifetime if the UID is found in the Active Object Table or executing a garbage collection routine (GCR) if the UID is not found in the Active Object Table.

In a further embodiment, a method, system and computer product for distributed key-value (object) storage are provided. According to an exemplary embodiment, along with the garbage collection mechanism, a method of garbage wiping (a garbage collection routine that prevents garbage creation when creating an object) is provided. Also, a method for durable and safe object creation, which prevents garbage accumulation in a system is provided.

In a further embodiment, a distributed key-value (object) storage provides for required properties of durability, eventual consistency and atomicity. The system can include of the following components: a name server configured to keep object names and related data with UIDs (unique identifiers); an object server configured to keep object data and related metadata with UIDs; a protocol end point receiving a request from the client and sending requests to a name server and an object server.

Thus, one embodiment of the invention provides a method and system for consistently inserting objects into a distributed key-value object storage, and for garbage collection in a distributed key-value object storage. An object has an object name and an object data, where object names and object data are stored on different servers. On a protocol end point (EP), the following functionality may be implemented: receiving a client request for inserting an object into a distributed key-value object storage; generating a unique identifier (UID) for the object; sending, to a name server, a request for creating a guard entry (GE) in a non-persistent storage. The guard entry has a GE finite lifetime. The guard entry indicates an intent to create the object, and acts as a timer, defines the time in which the objects should be consistently inserted in the object storage. The guard entry contains the object name and the UID.

The EP sends to the object server a request for creating a Garbage Collection Entry (GCE) in a persistent storage. The request also creates object and assigns space for the object data in a persistent storage. Creating object means that from that moment forward, it can be addressed via a UID provided in the creation request. Creating an object and a GCE entry is done atomically. A GCE is stored in a garbage collection table (GCT), which is maintained by the object server in persistent storage. The Garbage Collection Entry has a GCE finite lifetime and acts as a timer, defines the time in which the objects should be consistently inserted in the object storage.

The EP also sends to the object server the object data with a request for writing the object data to a persistent storage. The request is for writing the object data to object server only when the corresponding object exists. The request is processed on the object server only if the object exists.

The EP also sends to the name server a request for writing the object name into a persistent storage. The request is also for creating the object name at the name server when the corresponding GE exists and deleting the GE at the same time in a single atomic operation. The request is also to check the existence of the GE and if yes, for creating the object name.

The EP also sends a response to the client. When the object does not exist on object server during the writing or when the GE does not exists on the name server during name creation, the request fails to create the object, and reports to the client a successful object creation when all the requests to the name server and object server were successful. The EP sends to the object server a request for deleting the Garbage Collection Entry.

The name server is a server persistently storing object names and name metadata. Upon a request from the end point, the name server creates the guard entry in a non-persistent storage. The guard entry has GE finite lifetime and indicates an intent to create the object. The guard entry contains the object name (and the UID), and has a GE finite lifetime. Upon a request from the end point, the name server generates a guard entry to store the object name and the UID in a non-persistent storage. Upon a request from the end point, the name server checks the existence of the GE and when the GE exists inserts a name into a persistent storage and deletes GE in the same atomic operation. Upon a request from the end point the name server creates the object name when the corresponding GE exists and deletes the GE at the same time in a single atomic operation. When the GE does not exist on the name server during name creation, an error is returned. Upon GE lifetime expiration, then name server deletes the GE. Upon GE lifetime expiration the name server checks whether the UID is in the AOT (Active Object Table) on object server and either extends the GE lifetime if the UID is found in the AOT, or drops the GE if the UID is not found in AOT.

Upon a request from object server, the name server proves to the object server the existence of the name. In case the name does not exist, it deletes the corresponding GE before sending the response to the object server.

The object server is a server persistently storing object data and metadata related to the object. Upon a request from the end point, the object server creates a Garbage Collection Entry (GCE) in a persistent storage. The object server assigns space for the object data in persistent storage. The Garbage Collection Entry (GCE) has a GCE finite lifetime. Assigning space and creating the GCE is done atomically. The object server receives a request from the end point to write the object data to the persistent storage. The request is processed only if object exists. When the object does not exist on the object server during the writing, the object server will return an error message to the end point.

The object server has, in a persistent storage, a table (Garbage Collection Table—GCT) for storing GCEs. Upon a request from the end point to create the GCE, the object server creates a corresponding GCE in the Garbage Collection Table (GCT), where the GCE contains the UID and the object name and has a GCE lifetime.

The object server maintains an active object table (AOT) that represents a set of objects that were recently written.

Upon a request from the end point the object server deletes the GCE.

If the GE finite lifetime reaches zero, the name server deletes GE. If the object server maintains the AOT, and the GE finite lifetime reaches zero the name server checks the object UID in AOT and if yes→extends GE finite lifetime, if no→deletes GE. The object server checks whether the UID is in the AOT upon expiration of the GCE lifetime, and either extends the GCE lifetime if the UID is found in the AOT or executes a garbage collection routing (GCR) if the UID is not found in the AOT.

Upon executing the garbage collection routine (GCR) the object server tests the existence of the name on the name server. If the name is present, then the object server removes the GCE. Otherwise, the object server removes the GCE and the object, including its data.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
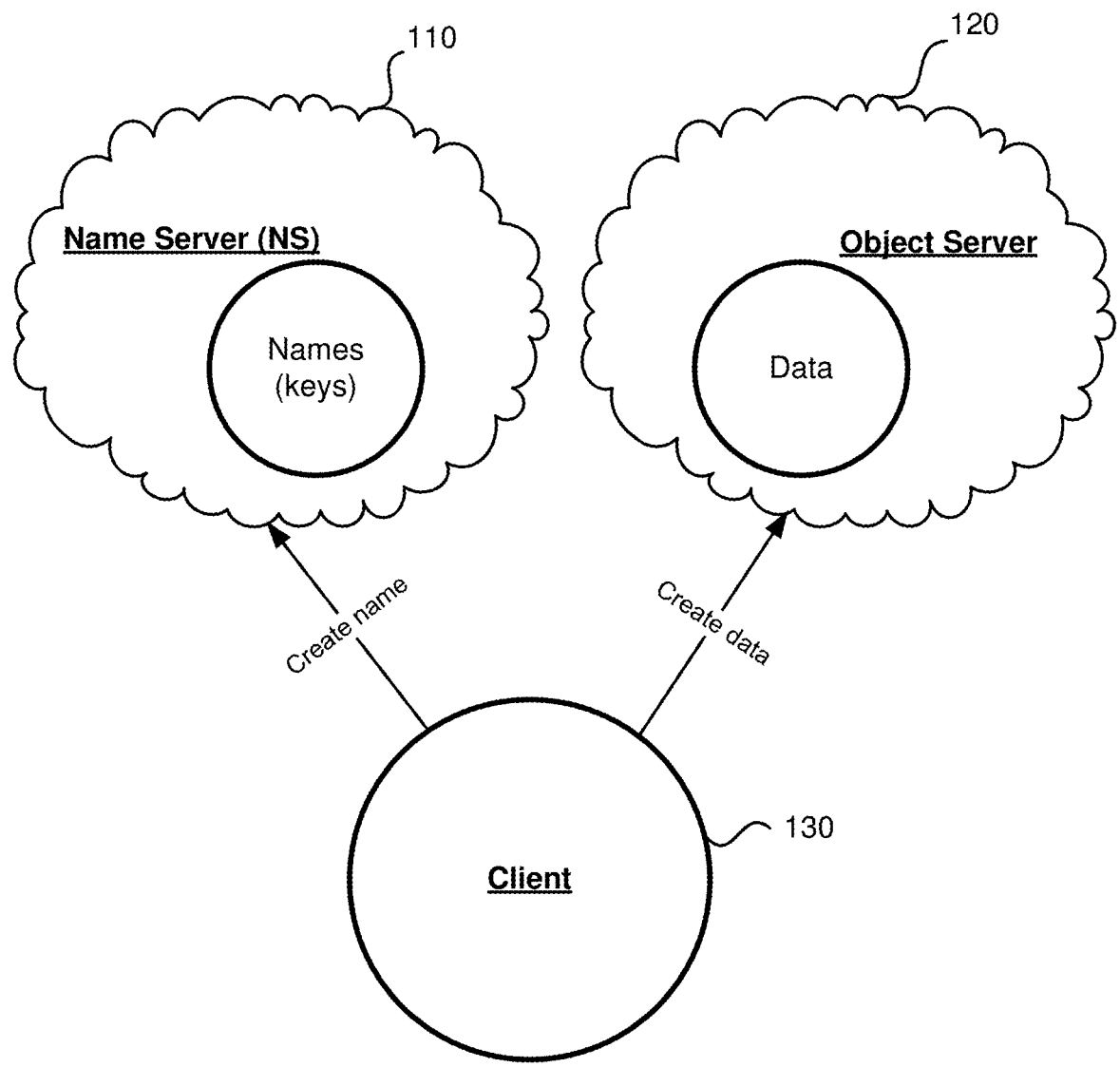
FIG. 1 illustrates a conventional system, which requires garbage collection.

Reference will now be made in detail to the preferred embodiments of the present invention, examples of which are illustrated in the accompanying drawings.

The present invention is directed to a method, system and computer product for durable and safe object creation, which prevents garbage accumulation in the system and protects against object servers of data after writing. According to one aspect of the invention, along with the garbage collection mechanism, a method of garbage wiping (a garbage collection tool which is aimed to prevent the fact of garbage creation when creating an object) is provided. Also, a method for durable and safe object creation, which prevents garbage accumulation in a system and protects from loss of data after writing, is provided.

Object storage provides to the clients the possibility of storing the objects of the arbitrary size. Unlike ordinary file systems, object storage has following properties:

1. Data cannot be modified. Blocks of data can be either read or deleted.

2. The names of the objects do not form a global hierarchy. Owner of objects can only get them ordered list within a container (bucket). There is no uniform namespace in the object storage. So it is possible to effectively store objects on multiple communicatively coupled servers. Such system is named as distributed storage, and a set of servers in it is named a cluster.

Objects in the storage have names (also called object names) and data (also called object data). The Object storage should provide 2 groups of operations:

1. operations with names, such as adding and deleting object names, getting the list of object names from one container (bucket)

2. operations with object data: adding (saving/creating) the data of the object, reading the data and deleting object data while deleting the whole object.

To get the list of object names from one container effectively it is better to store these names on one server. Though there can be many containers and many servers. Usually there are more operations with object data than with object names, so it is more efficient to distribute object data (even of objects from one container (bucket)) among different servers. Therefore it is more efficient to store object names and object data on different servers.

In one aspect, the object data and object servers are stored on the different servers. Servers storing object names are called name servers (NS) and servers storing object data are called object servers (OS).

Clients use standard protocol with public API to work with the distributed object storage, so the distribution of functions is transparent to the clients. The protocol uses function of both name server (NS) and object server (OS). The protocol of interfacing the clients is executed on the servers of the third type: gateway servers, or also called protocol endpoint servers (PE). These servers do not store data (neither object names nor object data), they are stateless servers. So they can be created dynamically according to the load of the cluster. Also clients requests can be redirected to particular endpoint (PE). This property is useful for load balancing and dynamic resource scheduling in the system.

Figure 2:
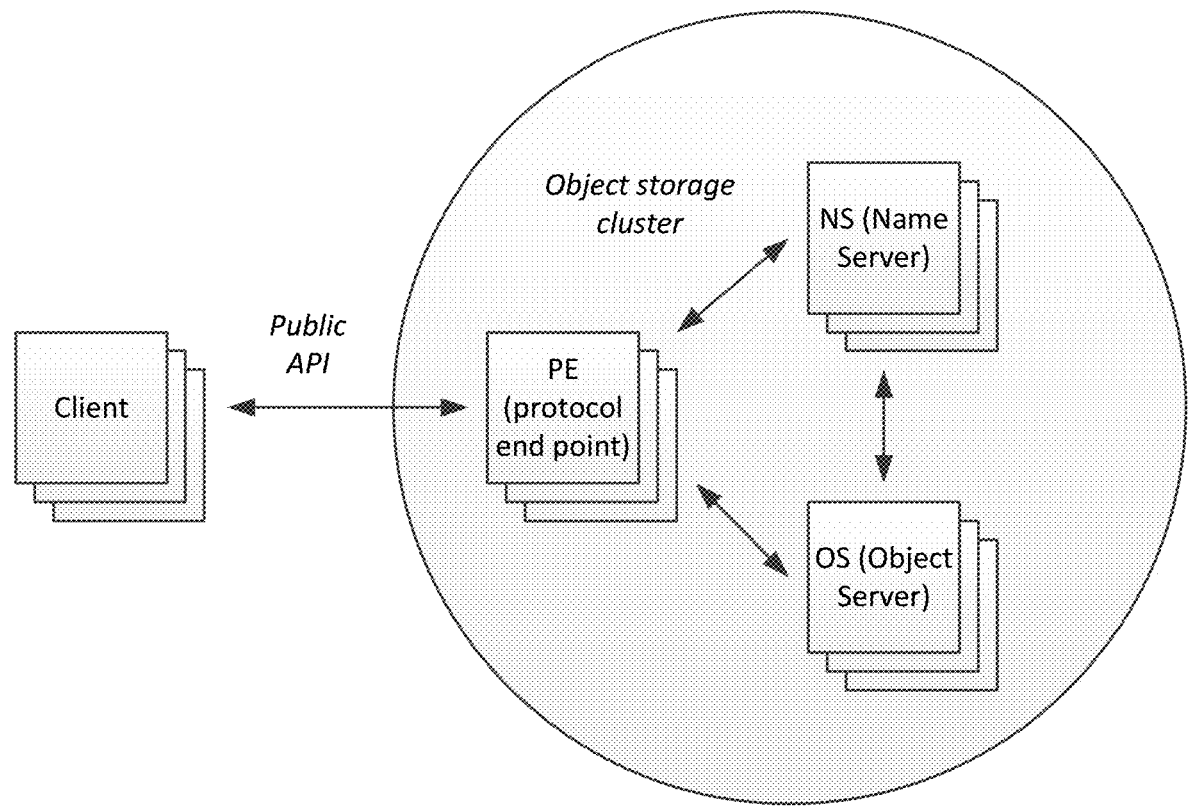
FIG. 2 shows the structure of the cluster of the object storage.

FIG. 2 shows the structure of the cluster of the object storage. The main components of the object storage are shown on the figure. Client sends requests to the storage (e.g. to save (create) or delete an object to or from the storage) using storage public API. The request comes to one of protocol endpoint servers (PEs), which processes the client request. The each PE is communicatively coupled to the name servers and object servers. Thus, the PE can send and receive requests (messages) to and from the name servers and object servers. Name servers and object servers also can communicate with each other. While processing the clients request, PE communicates to the NS where the object name should be stored and to the OS where the object data should be stored. It also, correspondingly, sends to them object name and object data.

The storage system (especially operations of creating and deleting object) must support the following properties (usually called ACID—Atomicity, Consistency, Isolation and Durability):

1. Atomicity. In the object storage atomicity means that the object creation will either succeed or will completely fail. There should not be situations when there is a name without data or data without name in the storage. In one aspect the system has eventual atomicity. This means that, after some finite time, each operation can either succeed or fail, so that there will be no trace of this operation in the object storage.

2. Consistency. Consistency means that each operation will return to client either success or fail, but the client will never get the name with already deleted or not yet created data.

3. Isolation. Isolation means that all operations are independent from each other.

4. Durability. Durability means that the result of any operation is saved in object storage and can be changed only by other operation on the same object.

In one aspect, the distributed object storage has 3 types of servers: PE, NS and OS and provides public API to clients. NS and OS support ACID properties. The algorithm of PE (e.g. operation of creating, deleting and searching objects) also supports the ACID.

For each object, object name is created (on NS) after creation of object data (on OS), and object name is deleted (from NS) before deletion of object data (from OS). Therefore the consistency is achieved. Either the client cannot find the object using the name, or client finds the fully consistent state of the object.

Each object in the system has a unique identifier (UID). Normally NS stores object name and UID of the object and OS stores object data and UID of the object. UID is needed if in some moment the system does not have name for the data or vice versa. In some aspects the UID can be a large random number, so that the probability of having two identical UIDs is negligible. Also, the NS can contain some object metadata (e.g. client name, creation date).

Selection of a specific OS and NS (for storing an object) from those available in the cluster can be made based on the name and the UID information and based on the division (partitioning) of namespaces and UIDs between servers. This information should be stored in the global cluster configuration, i.e., the configuration should be available to all its components.

The UID is created for each object by the PE in the beginning of the operation of object creation in the object storage. Then the pair {object data, UID} will be created on the NS and the pair {object name, UID} will be created on NS.

When deleting an object, first, the object name would be found on NS and the pair {object name, UID} would be deleted from the NS, and then the UID would be found on OS and the pair {object data, UID} would be deleted from the OS.

When searching for the object, first the pair {object name, UID} is found on NS and then using the UID the pair {object data, UID} is found on OS.

Figure 3:
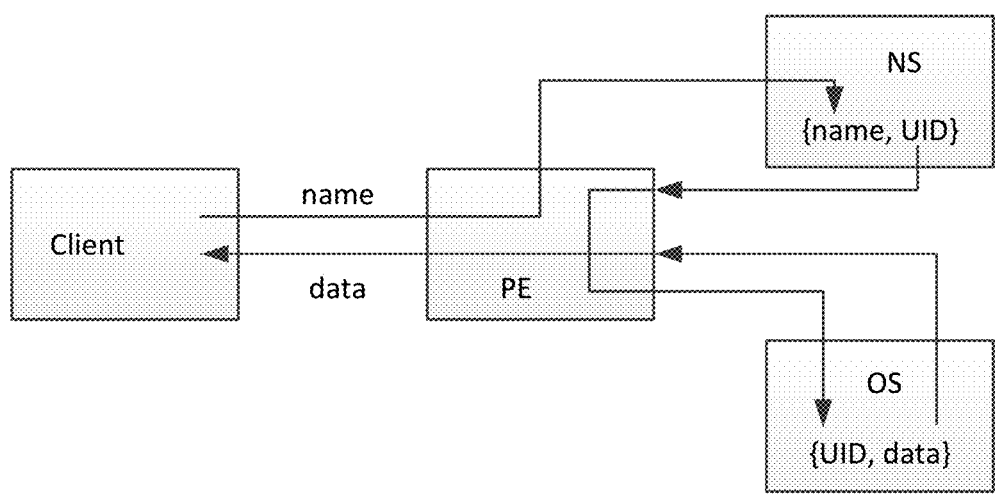
FIG. 3 shows the algorithm of searching for the object in the distributed object storage.

FIG. 3 shows the algorithm of searching for the object in the distributed object storage. The client sends to PE a request to find an object with a particular name in the distributed object storage. PE receives the request and get the object name from it. Then the PE selects the corresponding NS and OS, using the global cluster configuration or any other rule according to which the objects are stored on servers in the cluster. Then PE sends a request to the NS to find an object with that particular name. NS finds (if the object exists) the pair {object name, UID} and sends response to PE. PE gets the object UID and sends the request to OS to find the object with that particular UID. OS finds the pair {object name, UID} and sends response to PE. Then PE sends response to client. It is worse mention that if the object name exists, it means that the object data also exist. If NS returned UID, so the OS will find the object with this UID).

The described system supports all the properties of ACID except first.

PE can crash while processing the user request. So if is crashes while processing the operation of creation (deleting) object, there can be situations when the object data is already (still) on OS but the NS does not contain object name. In such situations there will be no links to such object data (such objects are called orphan objects or garbage), because of UID is stored only in the {name, UID} pair and also because PE do not have a state which could be restored after crash.

Thus, an additional procedure is needed that restores atomicity violations when they occur (e.g. collect garbage). So the procedure is called garbage collector (GC).

Garbage collector (GC) should work when PE crashes, so it should work independently of PE. GC is a set of procedures (routines) working on NS and OS.

GC stores the object UID in persistent storage. Record that contains the UID and other necessary information for GC, is called the garbage collection entry (GCE). There is a processing procedure for each GCE (GC handler), which is activated after a predetermined time after the creation of GCE. GCE is unreachable (i.e. invisible) to the client.

The algorithm of the garbage collection on deleting object is as follows. Client sends a request to PE for deleting an object from distributed object storage. PE sends a request to NS for deleting the object name and creating GCE (containing UID) in one atomic operation. NS in one atomic operation deletes the object name and creates a record called GCE, which contains the object UID. The PE end the operation and send a response to client. From Client's point of view the object is deleted, as it cannot be found using the object name. Then, in some period of time on the NS the procedure of this GCE (this GCE handler) is activated. in some aspects, there can be a timer, associated with the GCE record, so when the timer comes to 0, the GCE handler is activated. GCE handler (on NS) sends a request to OS for deleting the object data for the object with the UID. The OS deletes the object and sends to the NS a message about successful deleting the object. When NS gets a response from OS about successful deleting the object the GCE is deleted.

Figure 4:
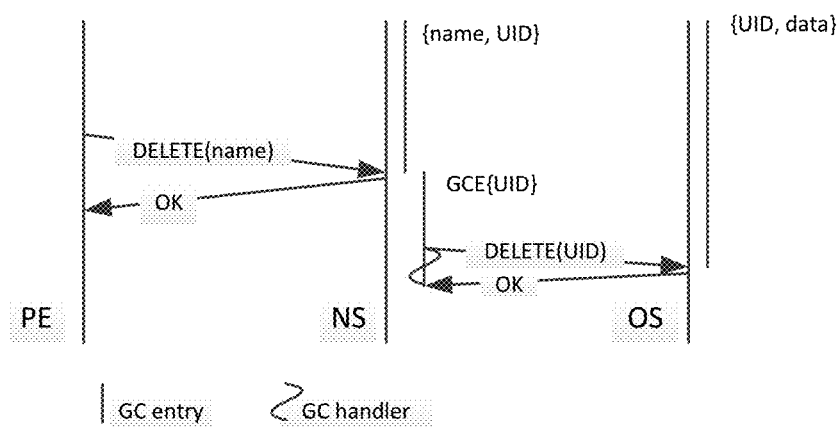
FIG. 4 shows the work of the garbage collector in deleting of the object.

FIG. 4 shows work of the garbage collector in deleting of the object. After clients request to PE for deleting the object. The PE sends a request to NS for atomically deleting the object name and creating the GCE. In the request the object is referenced by object name. NS processes the request. Before the request there was a pair {the object name, the UID}, after the processing the request (atomically) there is a GCE record containing the object UID and having some finite lifetime. Then NS reports successful ending of the operation the PE and PE reports the same to the client. When the GCE handler is activated on the NS (e.g. when the GCE lifetime comes to 0) the handler on NS send a request to OS to delete the object. In this request the object is referenced by the object UID. The OS process the request, i.e. deletes the object (e.g. the object data and the UID). The OS send a report of successful completion of the operation to the NS. After GCE handler gets this report the GCE is deleted.

Figure 5:
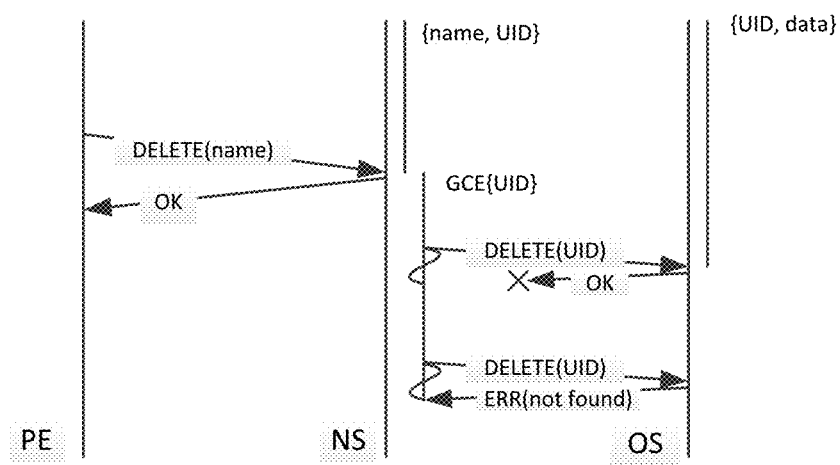
FIG. 5 shows the work of the garbage collector on deleting of the object when messages are lost.

FIG. 5 shows the work of the garbage collector on deleting of the object when messages are lost. When an error occurs (NS or OS crash, or loss of some messages), the GCE is not deleted and GCE handler restarts the operation (sending a request to OS for object deletion) after some time. GCE treats the situations when the UID was not found on the OS, as successful and deletes the GCE. The situation when the UID is not found on the OS, is considered as successful removal of the object data, as it can occur only when the response message about deleting the object was lost. Note that GCE is stored in the persistent memory on the NS, so NS or OS crash or message loss cannot break the eventually atomicity. This situation is shown in FIG. 5.

The algorithm of the garbage collection on creating object is as follows. When the object is being created the PE first sends a request to OS to save (create/load/store) object data in a persistent storage. The PE sends a request to NS to save (create/load/store) object name in a persistent storage. PE can crash. The atomicity can be broken if PE crashes before sending a request to the NS but after creation of the object data on the OS. To ensure the removal of these data at emergency shutdown of the PE, a GCE record is created on OS in a single transaction with the creation of the object (i.e. atomically with creation).

In some aspects GCE is a record containing the object UID. GCE has a finite lifetime, i.e. is associated with a timer. GCE has a GCE handler—a procedure which is activated on predefined conditions (e.g. when the timer comes to 0).

GCE handler sends a message (a request) to NS to ensure that the object name have already been created. E.g. GCE handler send to NS a request about existence of the object name. In the request the object is identified by UID. The NS searches for the UID and if finds that the name was created in persistent memory sends a confirmation to the OS.

OS (GCE handler) gets the response from NS. If the response says that the name exists, the GCE handler deletes the GCE.

If an error occurs (NS is unreachable or the message was lost) the GCE handler will restart the operation in some period of time. I.e. another request will be send to NS to ensure the existence of the object name.

GCE handling on OS and creation of the object name on NS can take place simultaneously. In the case when NS sends response to OS (to GCE handler) before the creation of the name is completed the OS will delete the object data, but NS will report successful object creation to the PE and will report the same to the client. So there must be some additional logic on the NS.

To solve the problem described above one more type of the records is stored on NS. Guard entry (GE)—is a record on NS. GE has a finite lifetime, i.e. there is a timer associated to the GE. GE handler is a procedure which is activated on predefined conditions (e.g. when the timer comes to 0). Unlike GCE, GE is stored in non-persistent storage (e.g. in volatile memory). GE record contains the pair {name, UID}. GE is unreachable (i.e. invisible) to the client.

Therefore, in one aspect, the procedure of creating the object in the distributed object storage includes the following steps (but is not limited by them):

1. On the NS, creating a GE record in non-persistent memory, GE containing a pair {object name, UID}.

2. On the OS, creating the object (in one aspect, just assigning space for the object data) and GCE record in one atomic operation and then loading object data.

3. On the NS, in one atomic operation creating the object name and deleting GE.

4. When all the operations were successful the PE sends a response to the client about successful object creation, then the GCE on the OS is deleted. The GCE can be deleted after a request of the PE, or it can be deleted by the GCE handler after some time. In case when the GCE is deleted by the GCE handler, the GCE will previously sent to the NS a request to ensure that the name was already created on the NS.

Figure 6:
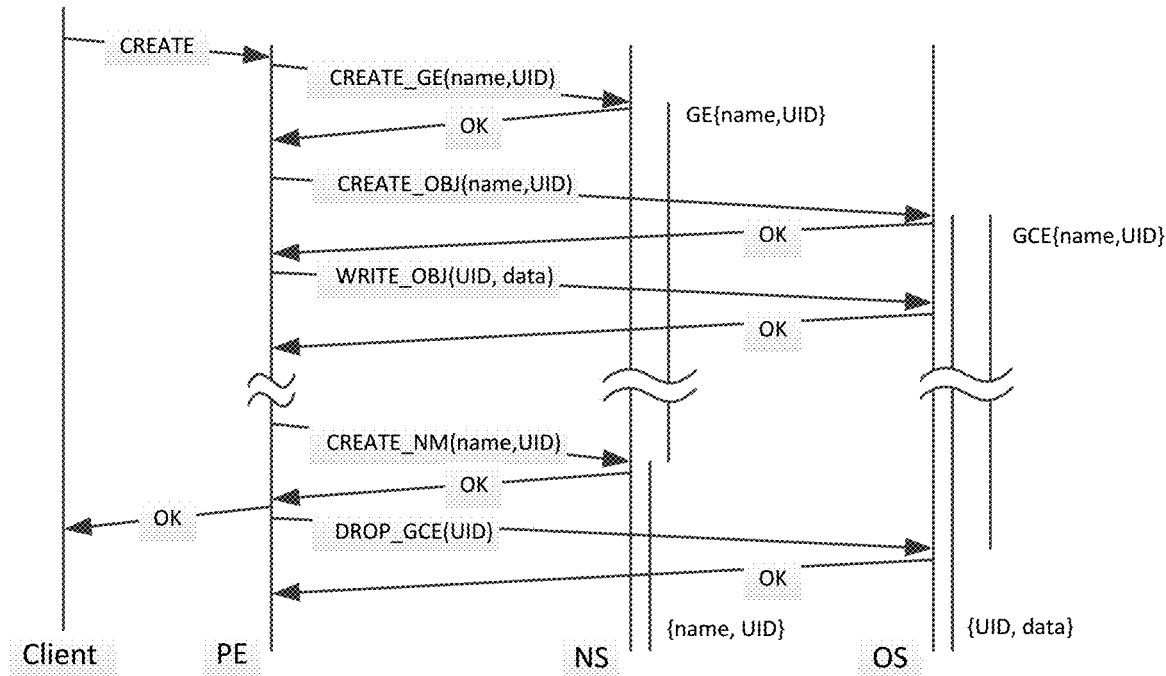
FIG. 6 shows the sequence of operations in successful object creation.

FIG. 6 shows the sequence of operations in successful object creation. Client sends to the PE a request for object creation. The PE sends a request (denoted "CREATE_GE (name, UID)") to the NS for creation of GE for the object in non-persistent storage. The request contains the object name and the UID (in some aspects UID is generated by the PE).

Upon such request, the NS creates the GE containing a pair {object name, UID} in a non-persistent memory. GE on the Object Server has a finite lifetime. The NS sends a response to PE about successful completion of the GE creation.

The PE sends a request (denoted by "CREATE_OBJ (name, UID)") to OS for in single atomic operation creation of object (e.g. assigning space in persistent storage for object data) and creation of GCE. Upon such request, the OS atomically assigns space for object data and creates GCE in the same atomic operation. GCE on OS has finite lifetime. GCE contains a pair {name, UID} and is located in persistent storage. OS reports successful operation completion to PE.

The PE sends a request (denoted by "WRITE_OBJ(UID, data)") to OS for writing object data. The request contains object data. Upon such request, the OS starts to write object data to the space assigned for this object. OS reports successful operation completion to PE. If there is no GCE on OS the operation fails.

The PE sends a request (denoted by "CREATE_NM (name, UID)") to NS for writing object name and UID to persistent storage. The request contains object name. Upon such request, the NS atomically writes pair {object name, UID} to persistent storage and deletes GE in the same atomic operation. NS reports successful operation completion to PE. The name is created only if GE exists. If there is no GE on NS the operation fails.

The PE reports successful operation completion to the Client.

Then optionally, the PE can send a request (denoted by "DROP_GCE(UID)") to OS for deleting of the GCE. The request contains the UID. Upon such request, the OS finds the GCE corresponding to the UID and deletes it. OS reports successful operation completion to PE. This operation is optional, because otherwise, in some time the GCE will be deleted by GCE anyway.

On FIG. 6 it can be seen also that the object data on the OS is created before the object name is created on the NS. In one aspect, the PE sends all these requests in a strict order. But processing of some requests by NS and OS can overlap in time.

Function of GE in NS.

1. Name can be created only when the corresponding GE exists. The GE is deleted in the same atomic operation as name creation.

2. If the name was not created in some period of time after creation of the GE (e.g., the GE timer comes to 0) the GE handler is activated and GE is deleted.

In one aspect, when the GCE timer comes to 0, the GCE handler sends request to NS in order to ensure the existence of the object name. The NS provides to OS the information about name and GE existence. If name exists the GCE is deleted. If name does not exist but GE exists the GCE handler repeats the operation after some time (i.e. sends request one more time). If neither name not GE exist on NS the GCE handler deletes the object from OS (deletes the object data) and deletes the GCE.

In other aspect the 3rd rule exists.

3. If the NS receives a request from GCE handler on OS in order to verify the existence of name, before sending a response message GE is removed, if it still exists.

Note that these rules exclude the situation where the name and GE exist simultaneously (at the same time). Also, the GCE cannot delete the object if the name has already been created, and the name cannot be created if the GCE removes the object, since after sending the first message about the absence of the name, we can be sure that at NS there is no name or GE. This in turn makes impossible the subsequent creation of the name. Therefore, the above procedure ensures atomicity resulting pairing of the name of the object and its data.

Figure 7:
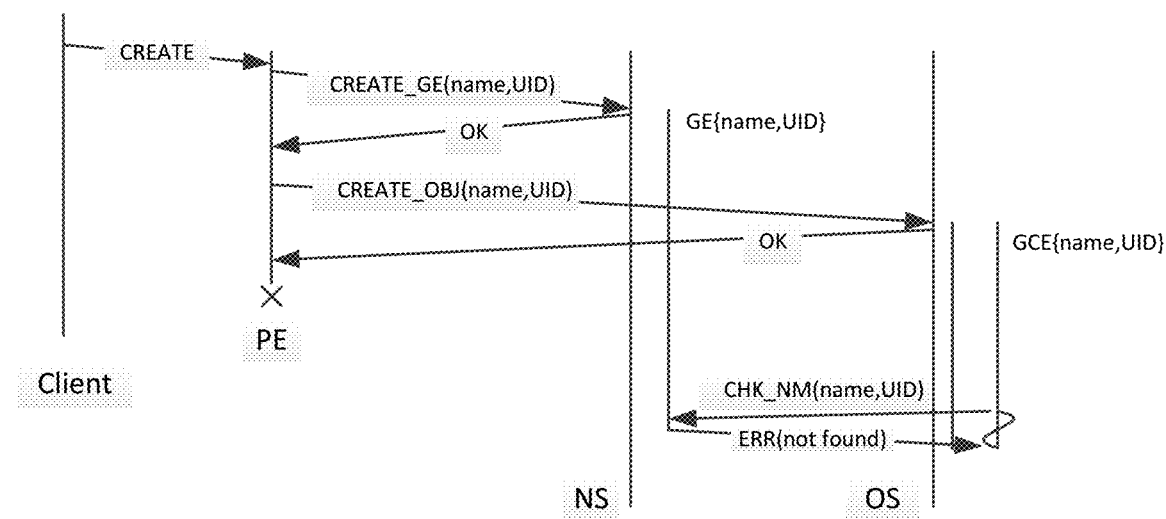
FIG. 7 shows the work of garbage collector in case of PE (protocol end point) crash.

FIG. 7 shows the work of garbage collector in case of PE (protocol end point) crash in one aspect, for example PE crashes just after sending a "CREATE_OBJ(name, UID)" request to OS. Then the OS creates GCE and created an object in persistent storage on OS in one atomic operation. OS sends a report of successful operation completion to PE. PE does not send neither request to OS to write object data to the object on OS nor request to NS for object name creation.

In some time the GCE handler is activated. (E.g., when GCE timer came to 0). The GCE handler sends a request to NS to check the existence of name or GE. NS does not find name but finds GE. NS deletes GE and sends to OS the error message ("ERR(not found)"). The OS receives the message. GCE handler on OS deletes the GCE and the object from OS.

Restart of NS results in the loss of all GE, which prevents the completion of the already started object creation procedures. To safely shut down the object creation procedure in such a situation, PE can use the following algorithm:

1. Finding that GE does not exist on the NS, PE creates it again.

2. PE sends a message to the OS to verify the existence of the data object (and the corresponding GCE).

3. If the data is there, PE creates a name for the object; otherwise, the procedure for creating of an object fails.

Figure 8:
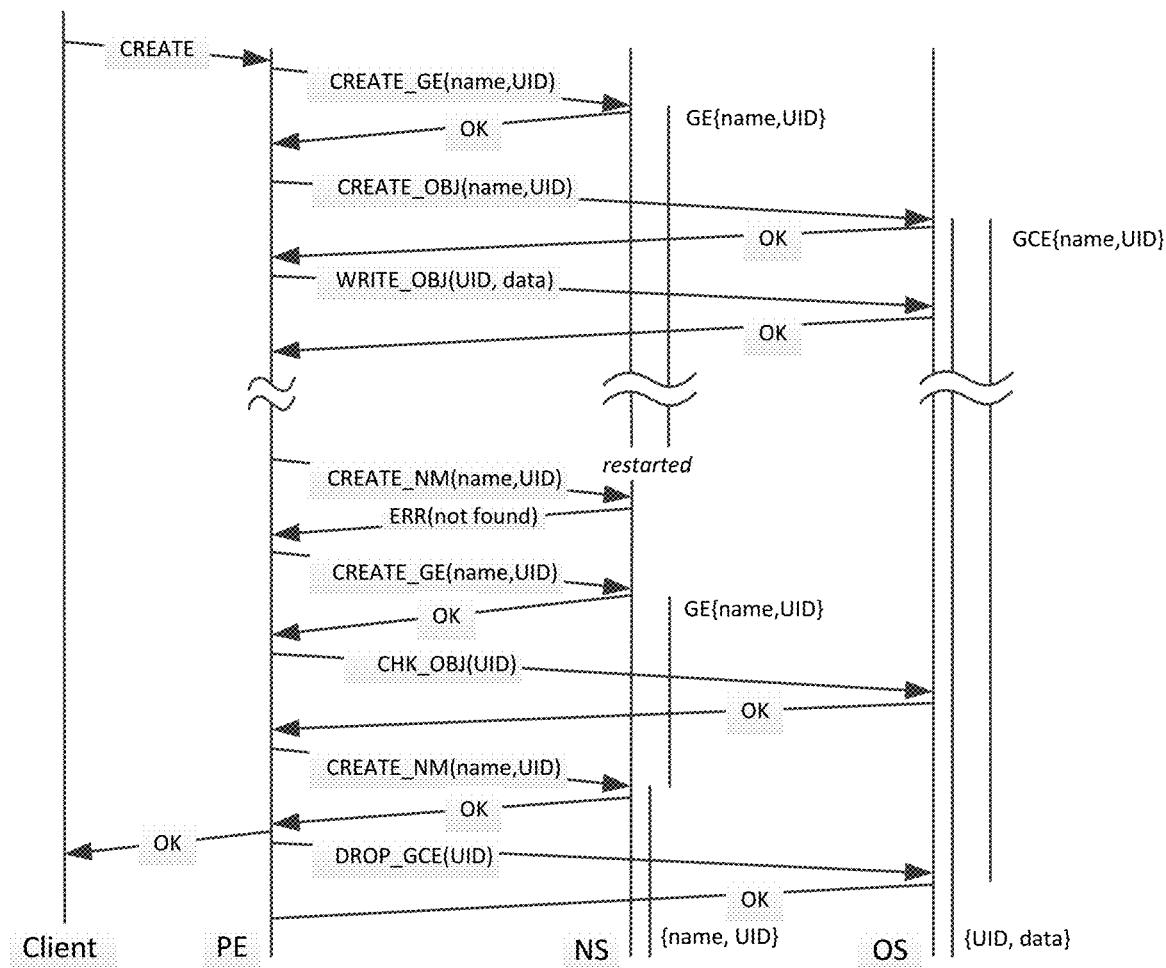
FIG. 8 shows recovery after restart of the NS during object creation.

FIG. 8 shows recovery after restart of the NS during object creation. The first part is analogous to the FIG. 6. But then just before receiving the request from PE to name creation (denoted "CREATE_NM(name, UID)") the NS was restarted. GEs are stored in volatile memory, so they do not exist on NS after restart. So the NS cannot find a GE and so cannot create the name (as the name can be created only when the corresponding GE exists). So NS sends to PE an error message (denoted "ERR(not found)").

In one aspect, PE restarts the operation of creating the object in the storage: sends request to NS to create GE. NS creates GE. In the aspect shown on the figure, PE sends a request to OS to check the existence of the object data (denoted "CHCK_OBJ(UID)"). In other aspect PE can just resend previous requests to OS and update GCE time.

Then the PE sends request to NS for object name creation. Now this operation succeeds and all other actions are analogous to FIG. 6.

The above algorithm assumes a priori knowledge of the upper time limit for object creation in the distributed object storage, after which we will activate GE and GCE handlers. In practice, the time of object creation can vary greatly depending on object size, system load and speed at which the customer provides the object data. In one aspect the algorithm is able to adapt the time of handler activation for a specific download speed of the object data. It is done to prevent errors when creating objects due to premature activation GE and GCE handlers.

The simplest version of the adaptive algorithm is as follows:

1. On the OS there is a hot objects table (HOT) also called active objects table (AOT). It allows for each object referenced by its UID to know whether data write requests came for this object within a certain time interval up to the current moment.

2. When GCE handler is activated, the handler looks for the UID in HOT. If the corresponding object recently had requests to write data, the GCE processing procedure is delayed for some time.

3. When activated, GE handler on NS sends a message to OS to test whether the UID is in HOT. Upon receiving a positive response performance of GE processing procedure is delayed for some time. GE treatment also delayed in the case of loss of communication or unavailability OS.

Hot objects table can be efficiently implemented in view of the admissibility of false responses such as false positive. That is, mistakenly declaring a cold object is hot, we did not break the operation of the system, provided that in the future it will still be correctly interpreted as a cold.

Let's assume there are two tables of N binary bits. One will be called the current (current), and the other obsolete (aged). Initially both tables contain only zero bits. Let's assume there is a hash function H (UID), receiving UID for input and as output giving an number ranging from 0 to N−1. Upon receiving a request to write object data the bits with number H(UID) in both tables are set to '1'. Periodically, with time period T the tables are updated, the current is copied to the aged, and then all the bits of current are set to '0'. Let's assume an object as hot, if in the aged table a bit having H(UID) number is set to '1'. This algorithm has the following property.

The object will be considered hot, if there was a write operation to the object starting from than the time T to the current moment. Indeed, in this case, we set to '1' the corresponding bit in the tables either before or after the last copying from the current table to the aged table, but not before the penultimate copying. Hence, the corresponding bit is set to '1', either in both tables or only in aged table. On the other hand, if the write does not occur during the time 2T up to the current moment, we can be assured (with the proviso below) that the corresponding bits in the two tables are equal to '0'. Indeed, in this case, since the last setting the bit to '1' had passed at least 2 updates of the tables, so that the '1' bit has been reset to '0'. The only situation where this assertion is violated—if the recording took place for a different object with a matching H(UID). This false interpretation can only lengthen the removal of garbage, provided that it is not repeated all the time.

Figure 9:
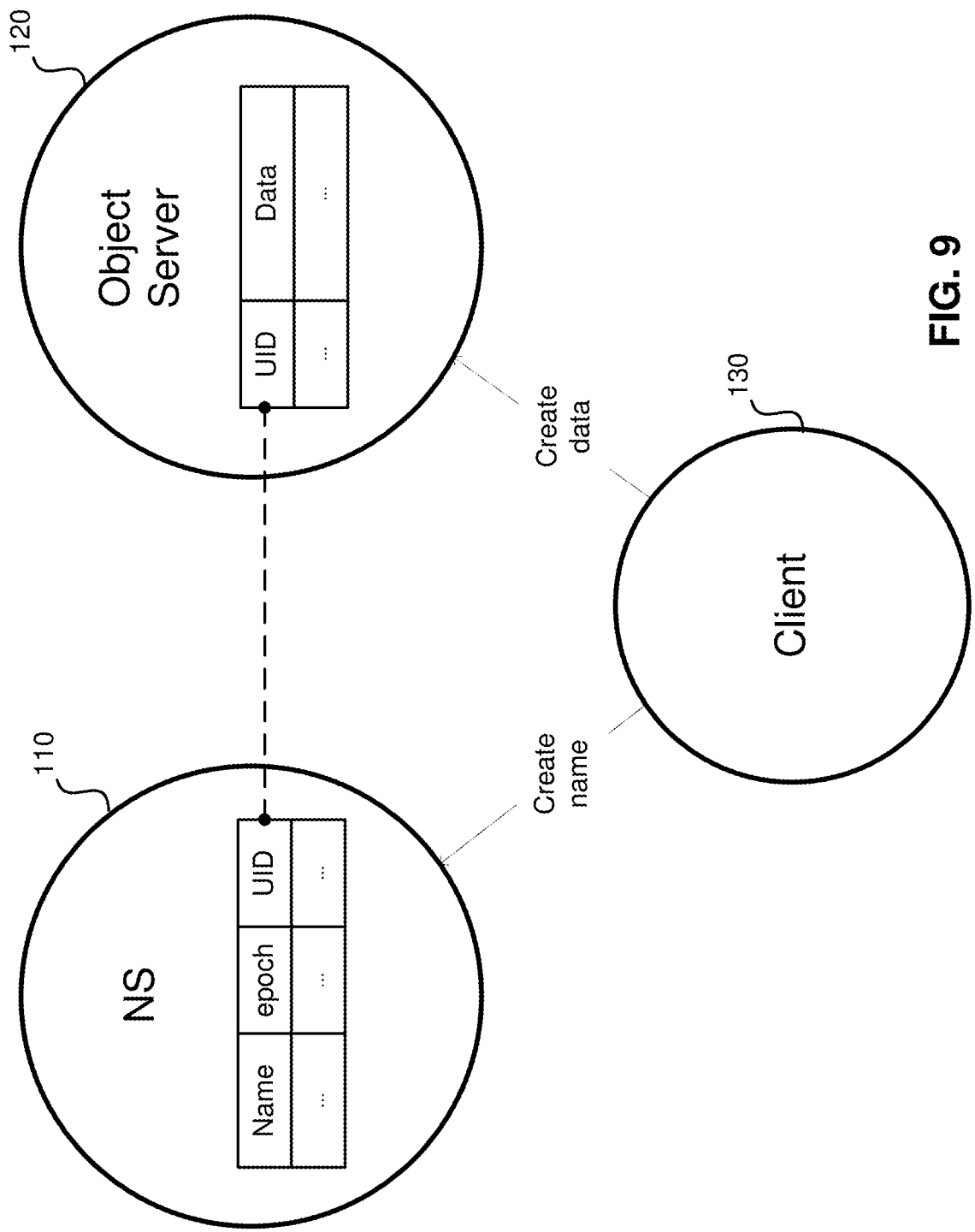
FIG. 9 illustrates a schema of the database relations, in accordance with the exemplary embodiment.

According to the second embodiment, the NS and OS may be treated as relational databases with a first column serving as a primary key. The schema of the corresponding relations is shown in FIG. 9. The object server 120 keeps object data associated with some unique identifier (UID). The UIDs are generated randomly upon object creation and their space is large enough to ensure that the two equal identifiers are never produced during the system lifetime. The UID serves as a foreign key for the names relation. Every row of the name relation has a name serving as a primary key as well as UID referencing the data associated with the name. Since the name may be replaced by another one referencing different object, an additional identifier is used to discriminate different instances of the same name (i.e., the UID can be used for that purpose and a separate identifier is introduced for clarity).

The third element of the name is the epoch number. According to the exemplary embodiment, the epoch numbers have similar properties as the UIDs. Note that objects are never replaced, since the UIDs are unique. Thus, the epoch numbers are not needed for the objects, provided that the data is not modified after creation. Consequently, the UID always refers to the particular object data instance, while the name refers only to the current name-data binding.

The (name, epoch) pair can be used to identify the particular instance of the name, which is extensively used in the garbage collector (GC) design discussed below.

Figure 10:
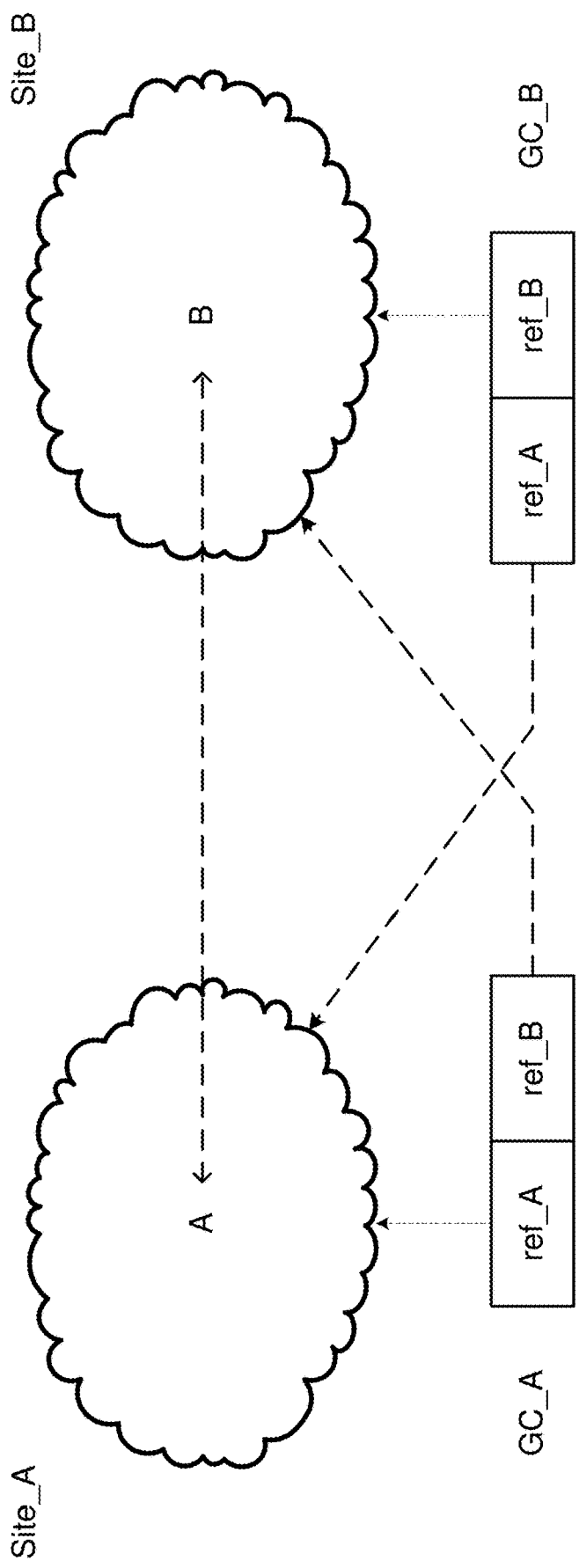
FIG. 10 illustrates a concept of garbage collection, in accordance with the exemplary embodiment.

A concept of garbage collection, in accordance with the exemplary embodiment, is illustrated by FIG. 10. Suppose the client (not shown on the figure) is going to create a linked pair of entities A and B on two distinct sites Site_A and Site_B. In order to prevent the situation when only A is created due to a client crash, the following approach is used. On a stable storage at the same time as the entity A is created, the GC entry GC_A is created with the pair of references to A and B: GC_A={ref_A, ref_B}. After some time the GC entry can be "activated" by a server process (using a timer, for example). Upon GC_A activation, the Site_A will send message to Site_B in order to check the existence of the B entity.

In the event that B does not exist, the entity A is removed from Site_A. Upon completion of the GC entry processing, A is removed from the stable storage. A similar approach can be implemented on the Site_B in order to prevent the situation when only B part of the linked pair is created as a result of the client crash. Just GC_B={ref_A, ref_B} is created on the Site_B with the same processing rules. Such a "symmetric" garbage collector looks simple, but despite that it does not guarantee even the durability property (1) in case the message propagation delays are unbounded.

This can be proven by following sequence of events:
1. Create A and GC_A on Site_A;
2. GC_A activated, message is sent to Site_B in order to query B existence;
3. Query message received at Site_B, negative response is sent;
4. Create B and ref_B on Site_B;
5. Successful creation of A-B pair is reported to the client;
6. Negative query response is received at Site_A, entity A deleted;
7. GC_B activated and ultimately delete B.

Note that the situation may not be improved by moving all processing to the one part of the system.

Figure 11:
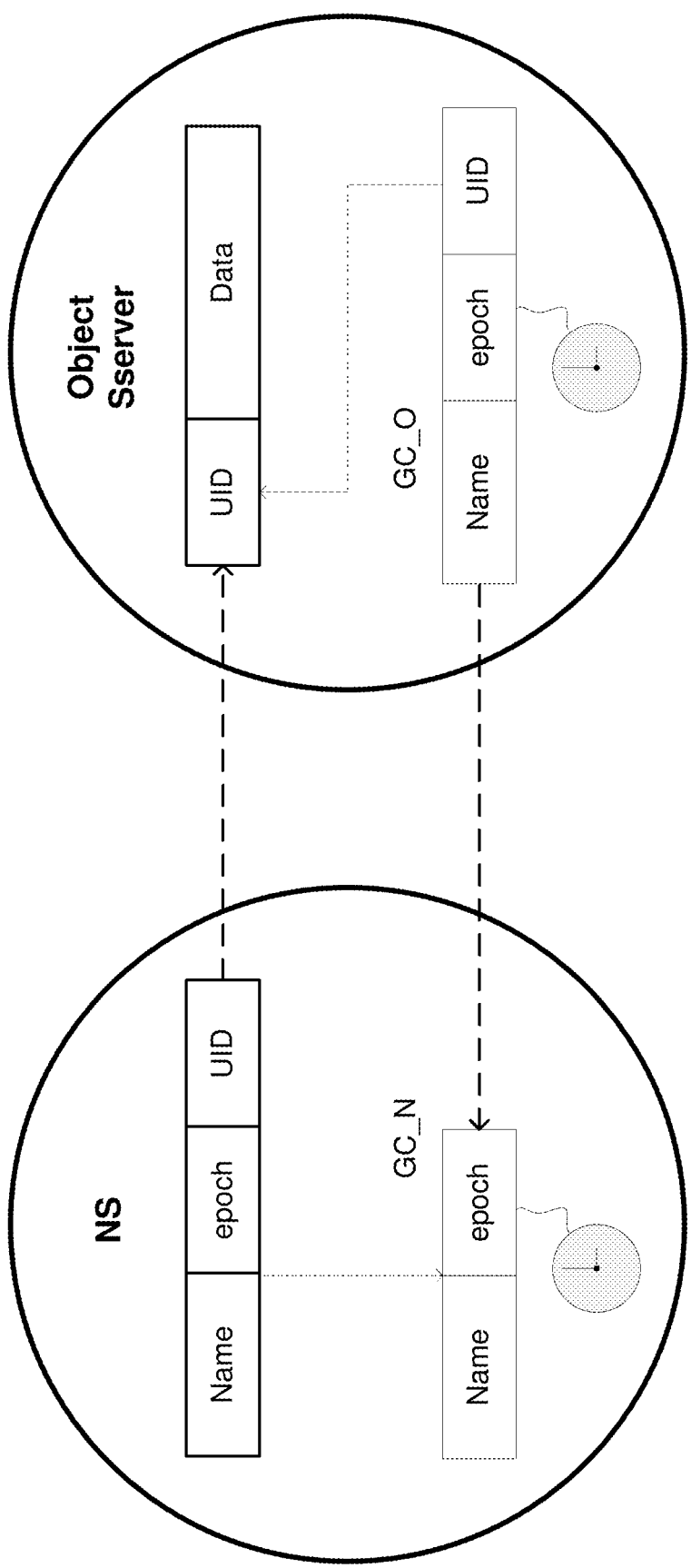
FIG. 11 illustrates a garbage collector (GC), in accordance with the exemplary embodiment.

A scenario depicted in FIG. 10 is addressed in FIG. 11 depicting garbage collection (GC) implementation enforcing all of the required properties (1-3). The implementation becomes possible by adding asymmetry to the system and relying on the fact that the Object Server entities never have conflicting identifiers, so several data objects bounded to the same name (with different epoch) may temporarily exist. The design of such GC is shown in FIG. 11. The name-object pair creation in the exemplary system involves the following steps:

C1. Create GC entry GC_N on the NS with a name, an epoch pair identifying the name instance to be created. Commit the GC entry to the stable storage and setup a timer for GC entry activation;

C2. Create object data on the Object Server and GC entry GC_O with reference to the name instance to be created and an object data UID. Both should be created atomically (so there is no chance of a crash in-between);

C3. Create name on the NS. Before creation of the new name the NS ensures that there is a GC entry with the same name and epoch as the one to be created. Otherwise, the create routine is aborted. Upon successful name creation the GC entry is dropped atomically (so there is no chance of a crash in-between);

C4. Report successful object creation to the client;

C5. Drop GC_O (optional).

The GC_O entry processing upon activation (by timer) involves the following steps:

GO1. Send a special "validate" message to the NS with a name and an epoch corresponding to the name instance to be created. The NS sends a positive response if the name exists while GC_N does not. In case only GC_N exists, the NS will drop it, commit to the stable storage and then send a negative response. In case neither name nor GC_N exists, the NS sends a negative response immediately. Note that the exemplary embodiment may involve waiting for pending commits completion before sending a response to ensure crash-consistency;

GO2. In case of a negative response to a validation request, the Object Server drops an object data. In case of an undefined response (i.e., a network timeout), it resends the request, otherwise drops GC entry.

The GC_N entry processing upon activation (by a timer) involves the only step:

GN1. Drop GC_N entry.

Note that the principal difference between the proposed approach and the symmetric GC implementation discussed above—only GC_O can delete object data. The GC_N does not delete anything and plays a role of an operation guard. The name is being created as the last (non-optional) stage of the algorithm based on the current guard state.

According to the exemplary embodiment, the durability proof comes from the following statements:

If the response on stage GO02 is negative, the guard is deleted, so creation cannot succeed;

Once the name is created, the response at stage GO02 is guaranteed to be positive.

The consistency property proof comes from the following:

the process cannot end up with a name created, but an object deleted due to the above reasons;

in case the object is created while the name is not, the GC_O will be eventually activated. The response at stage GO02 is guaranteed to be negative, so the object will be eventually deleted.

Since the name is being created as the last non-optional stage of the algorithm, the atomicity proof is obvious—once the new name instance is created, the name-object pair is durable. Otherwise, the old name instance is kept intact.

Note that the above described protocol requires three commits to the stable storage during a name-object creation, unlike the "symmetric" version, which takes only two commits. The difference can be critical for performance, since commits to the stable storage are usually the most time consuming part of algorithm execution. On the other hand, since the GC_N does not affect persistent state by itself (does not delete anything), it does not have to be persistent. The non-persistent version of the GC is referred to as the "guard table." The only downside of storing GC_N in a volatile storage is a possibility of failure in case of the NS crash. The client may detect such situation, provided that the NS returns the dedicated error code at stage C3 in case GC_N is not found on a server. Upon receiving such dedicated error code, the client may just restart the algorithm, immediately re-creating GC_N entry.

Reloading object data after the NS crash may be problematic, especially, in case the data is too large to be cached on the client. On the other hand, since the data is already loaded to the Object Server, the process ensures that the state of the system is exactly the same as it was after the first algorithm execution. The client can use a special "verify" message for that purpose. The Object Server extracts the object UID from the message and returns a positive response in case the following conditions are met:

The object with such UID exists;

The corresponding GC_O entry exists and is not yet activated.

Upon sending a positive response to the verification message, the Object Server restarts the GC_O entry timeout. If the response is negative, the client aborts the algorithm execution. Otherwise, it repeats steps C3-C5 to completion.

Figure 12:
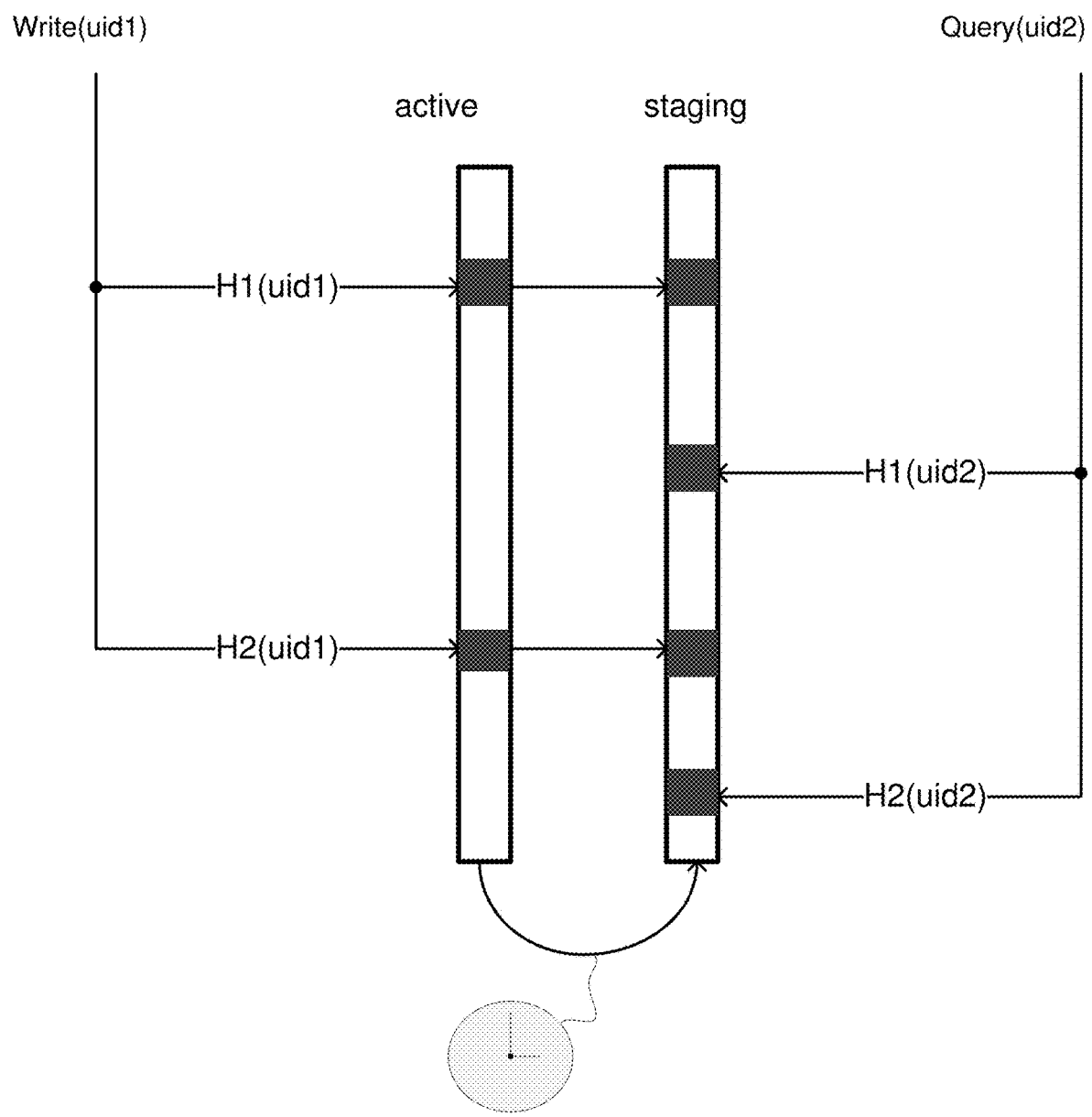
FIG. 12 illustrates an exemplary design of objects table.

In case the name and object creation takes a much shorter time than possible message propagation delays, the GC entries timeout can be chosen based on the latter. However, if a large amount of object data is stored, the process can takes an arbitrary long time. To avoid aborting object data writing by timeout, a mechanism preventing GC activation while writing is in progress is needed. A possible solution is to maintain some sort of a "hot" objects table in Object Service memory. Before activation, both GC routines consult with that table (i.e., the NS has to send a special message for that). In case the object is "hot" (i.e., being currently written), the GC timeout is prolonged. An exemplary design of such table is shown in FIG. 12.

The "hot" object table consists of two bitmaps (Bloom filters)—active and staging and the timer activated with some period T. Upon writing the objects, the process calculates two (or possibly more) hash functions using the object UID as an argument and sets corresponding bits in both bitmaps. In order to query whether the object with a particular UID is "hot," the process calculates the same hashes using the UID as an argument and returns a positive result in case both bits in the staging bitmap are set. Upon a timer activation, the process can copy the content of the active bitmap onto the staging bitmap and reset all bits set in the active bitmap. Thus, once the particular object is written, it will be reported as "hot" during the subsequent time of at least T and at most 2T. Note that in order to prevent false negatives after an Object Server crash, the process reports all objects as "hot" during time T right after the Object Server start.

FIGS. 13 and 14A-14D illustrate client and NS/Object Server actions on inserting a new name—a data pair. They are intentionally kept as simple as possible. In particular, the error handling is simplified and a message retransmission in case of network failures is not shown.

Figure 13:
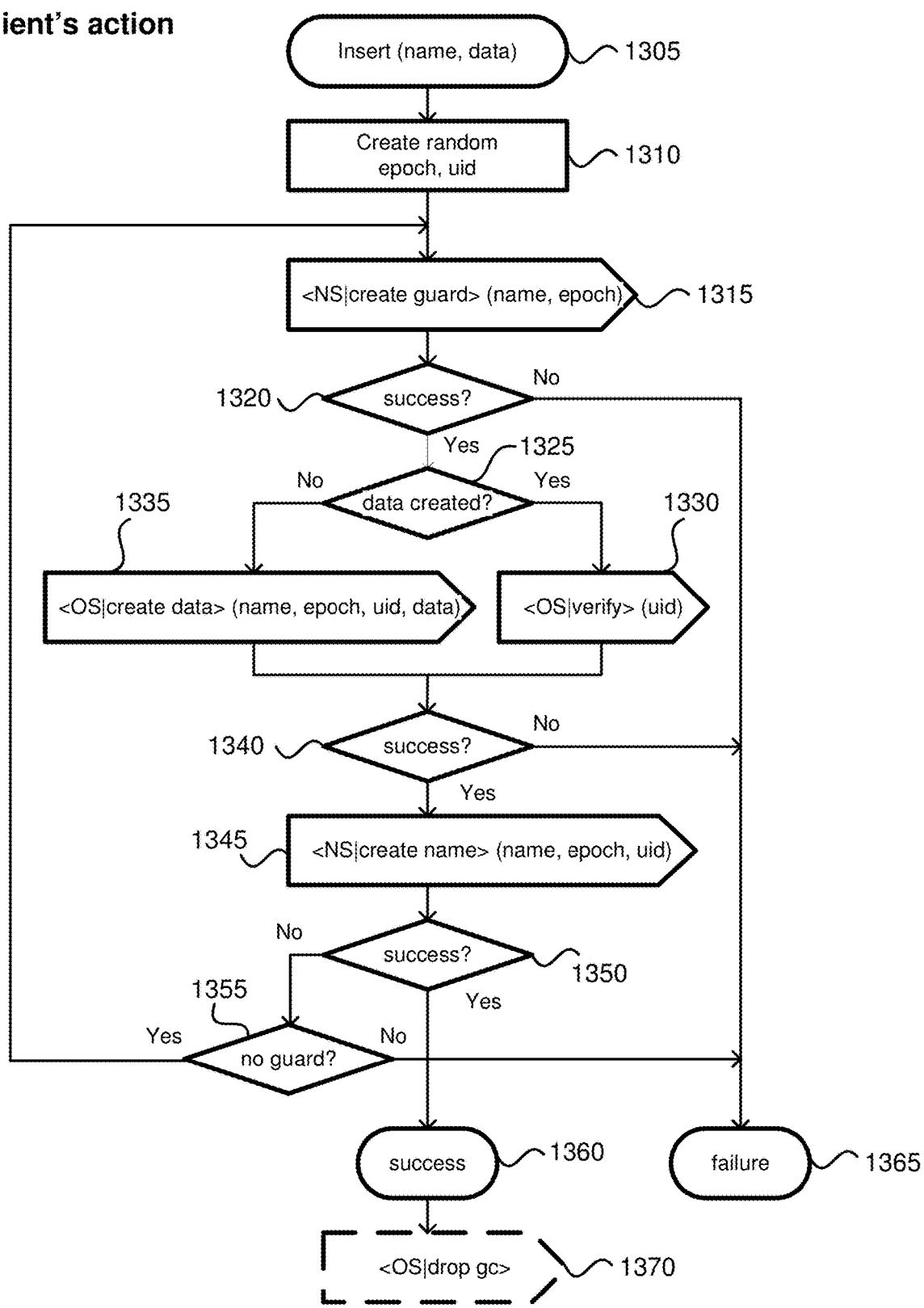
FIG. 13 illustrates a flowchart depicting client's actions, in accordance with the exemplary embodiment.

FIG. 13 illustrates a flowchart depicting client's actions, in accordance with the exemplary embodiment. In step 1305, a client inserts name and data. In step 1310, a random, epoch and UID are generated. In step 1315, a name server creates a guard based on the name and the epoch. If the creation is unsuccessful in step 1320, a failure message is generated in step 1365. Otherwise, the process checks if data is created, in step 1325. If the data is created, the object server verifies the UID in step 1330. Otherwise, the object server creates data using the name, the epoch, the UID and the data in step 1335. If step 1335 or 1330 is successful in step 1340, the name server creates a name based on the name, the epoch and the UID in step 1345. Otherwise, a failure message is generated in step 1365.

If the name creation is successful in step 1350, the success message is generated in step 1360, and the object server drops garbage collection in step 1370. Otherwise, if a guard is detected in step 1355, the failure message is generated in step 1365. Otherwise, the process moves to step 1315, where the guard is created.

Figure 14A:
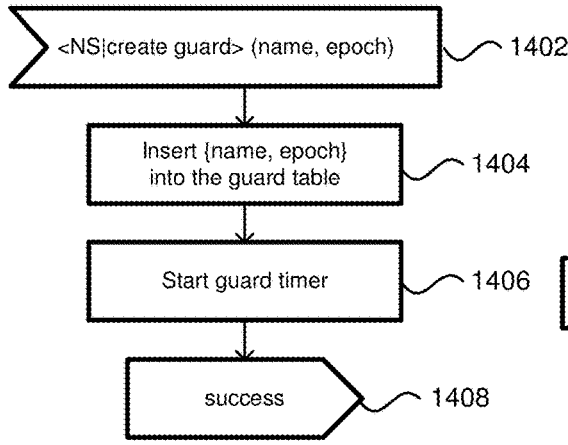
FIGS. 14A-14D illustrate flowcharts for name server event handlers.
Figure 14B:
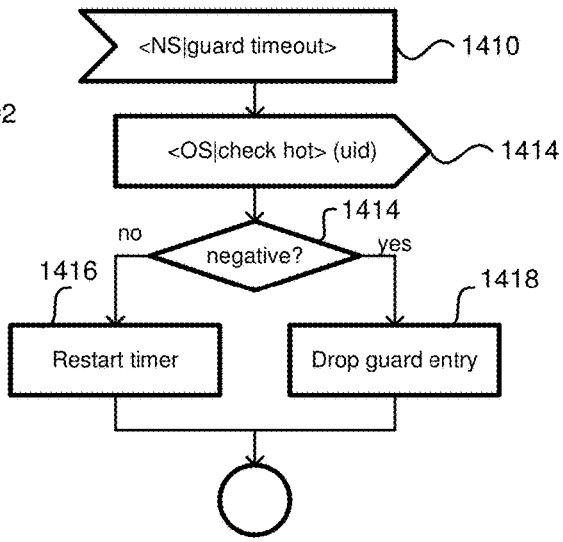

FIGS. 14A-14D illustrate flowcharts for name server event handlers. In FIG. 14A the name server creates a guard based on a name and an epoch in step 1402. The name and the epoch are inserted into the guard table in step 1404. A guard timer is started in step 1406. A success message is generated in step 1408. In FIG. 14B, the name server generates a guard time out in step 1410. The object server checks if the UID is "hot" in step 1412. If the check is negative in step 1414, the guard entry is dropped in step 1418. Otherwise, the timer is restarted in step 1416.

Figure 14C:
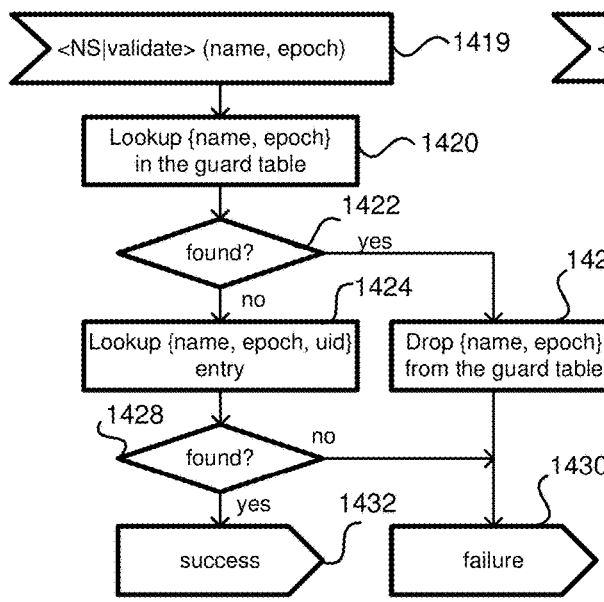

In FIG. 14C the name server validates the name and the epoch in step 1419. The name server looks up the name and the epoch in the guard table in step 1420. If the data is found in step 1422, the process drops the name, and the epoch from the guard table in step 1426, and the failure message is generated in step 1430. Otherwise, the name server looks up the name, the epoch and the UID entry in step 1424. If the entry is found in step 1428, the success message is generated in step 1432. Otherwise, the process moves to step 1430.

Figure 14D:
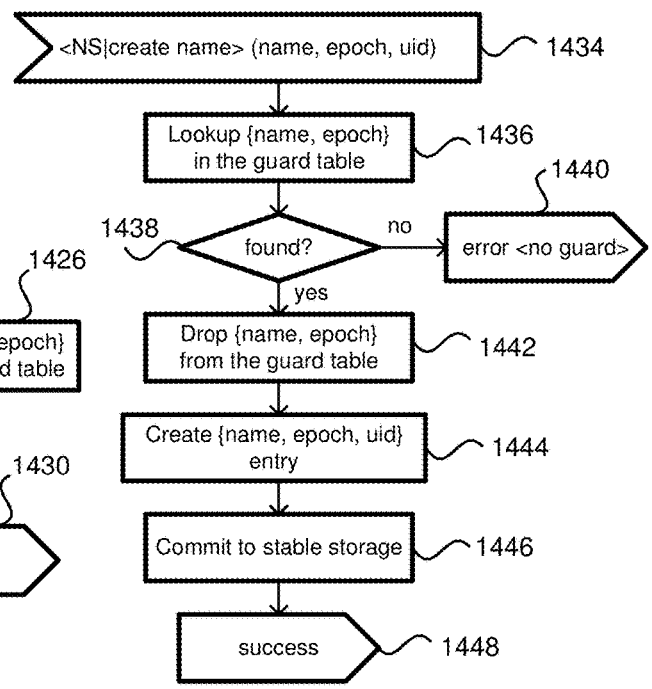

In FIG. 14D the name server creates a name based on the name, the epoch and the UID in step 1434. In step 1436, the name server looks up the name and the epoch in the guard table. If the data is found in step 1438, the process drops the name and the epoch from the guard table in step 1442. Otherwise an error message "no guard" is generated in step 1440. In step 1444, the name, the epoch and the UID entry is created. The entry is committed to a stable storage in step 1446 and the success message is generated in step 1448.

Figure 15B:
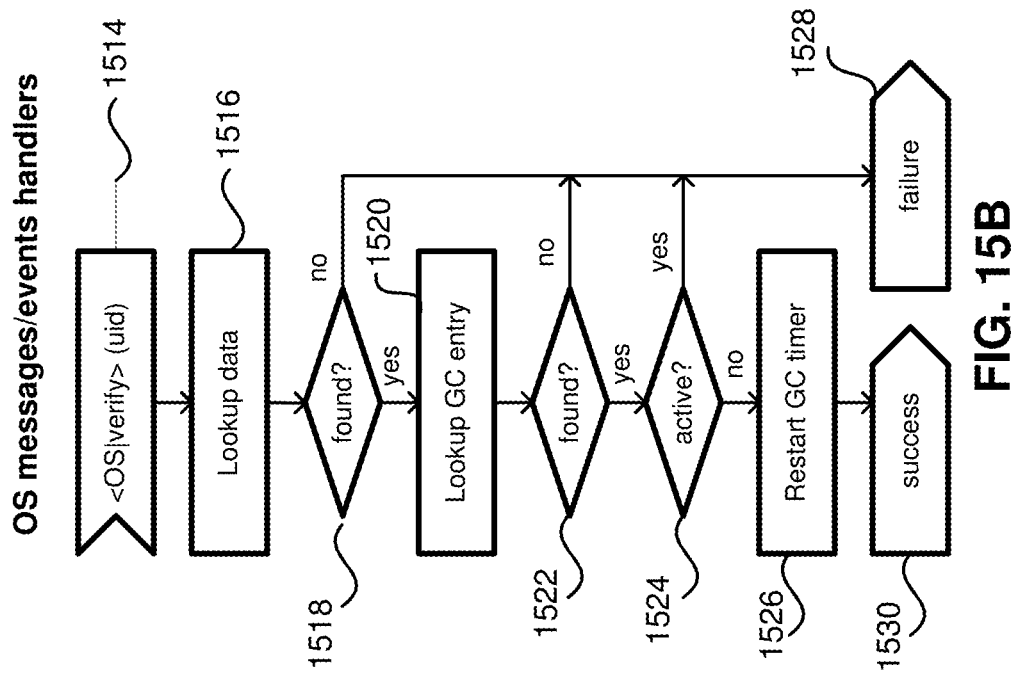
FIGS. 15A-15D illustrate flowcharts for object server event handlers.
Figure 15A:
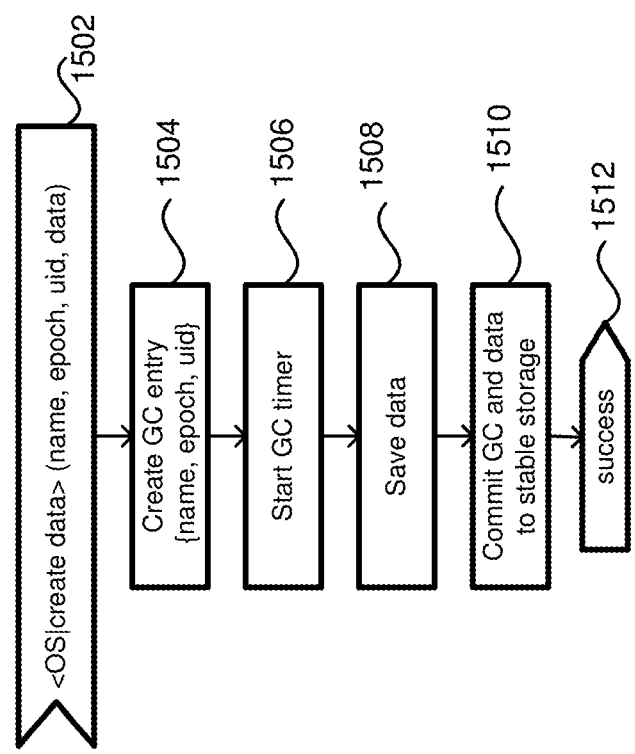

FIGS. 15A-15D illustrate flowcharts for object server event handlers. In FIG. 15A an object server creates data based on a name, an epoch, the UID and the data in step 1502. In step 1504, the process creates GC entry based on the name, the epoch and the UID. In step 1506, a GS timer is started. The data is saved in step 1508. The GC and the data are committed to a stable storage in step 1510 and a success message is generated in step 1512.

In FIG. 15B, the object server verifies the UID in step 1514. The object server looks up data in step 1516. If the data is found in step 1518, the process looks up the GC entry in step 1520. Otherwise, a failure message is generated in step 1528. If the GC entry is found in step 1522, the process checks if the entry is active in step 1524. Otherwise, the failure message is generated in step 1528. If the entry is active in step 1524, the failure message is generated in step 1528. Otherwise, the GC timer is restarted in step 1526 and a success message is generated in step 1530.

Figure 15D:
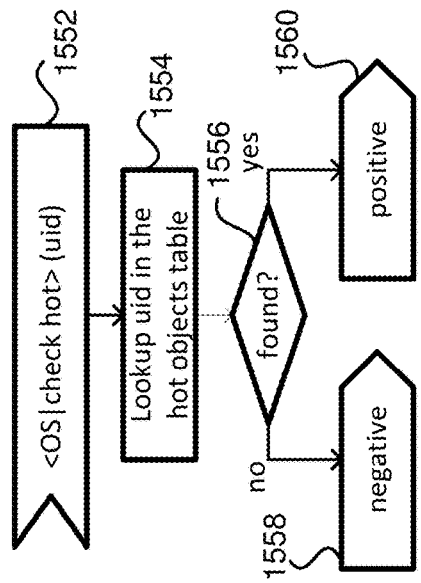
Figure 15C:
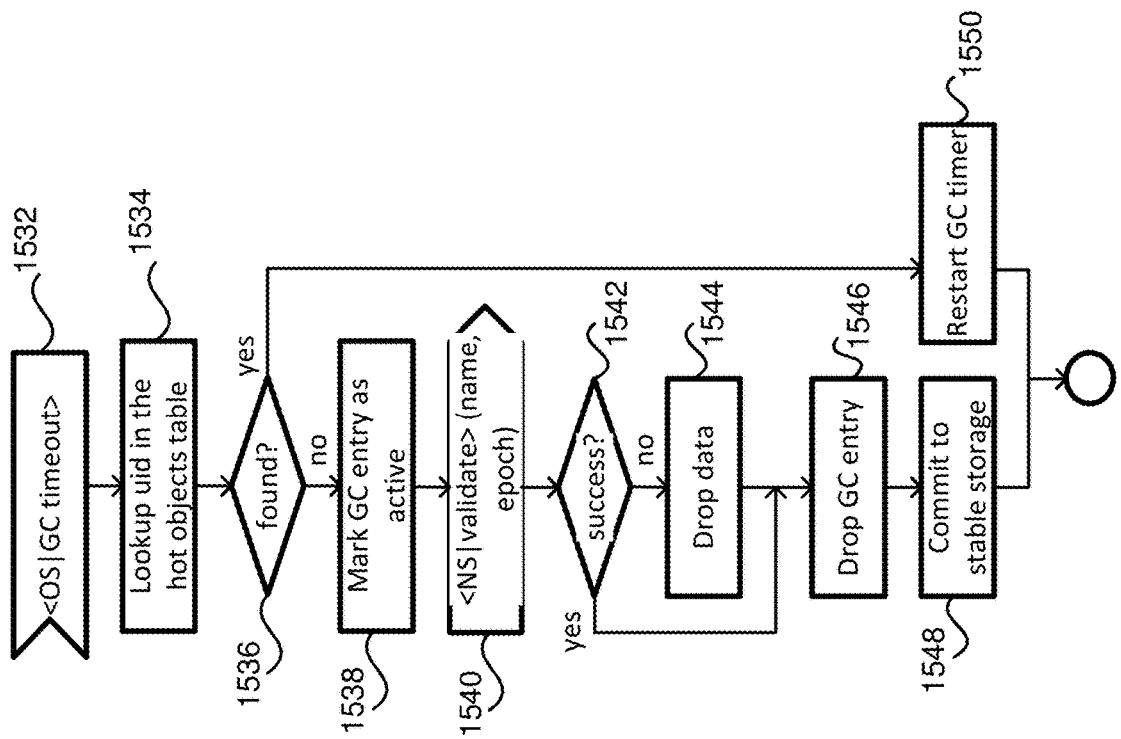

In FIG. 15C, the object server generates a GC timeout in step 1532. The process looks up the UID in the "hot" objects table in step 1534. If the UID is found in step 1536, the GC timer is restarted in step 1550. Otherwise, the GC entry is marked as active in step 1538. The name server validates the name and the epoch in step 1540. If the validation is successful in step 1542, the process drops GC entry in step 1546. Otherwise, the data is dropped in step 1544. In step 1548, the data is committed to stable data storage.

In FIG. 15D, the object server checks for the UID in the "hot" objects table in step 1552 by looking up the UID in the "hot" objects table in step 1554. If the UID is found in step 1556, the process generates a positive response in step 1560. Otherwise, a negative response is generated in step 1558.

Figure 16:
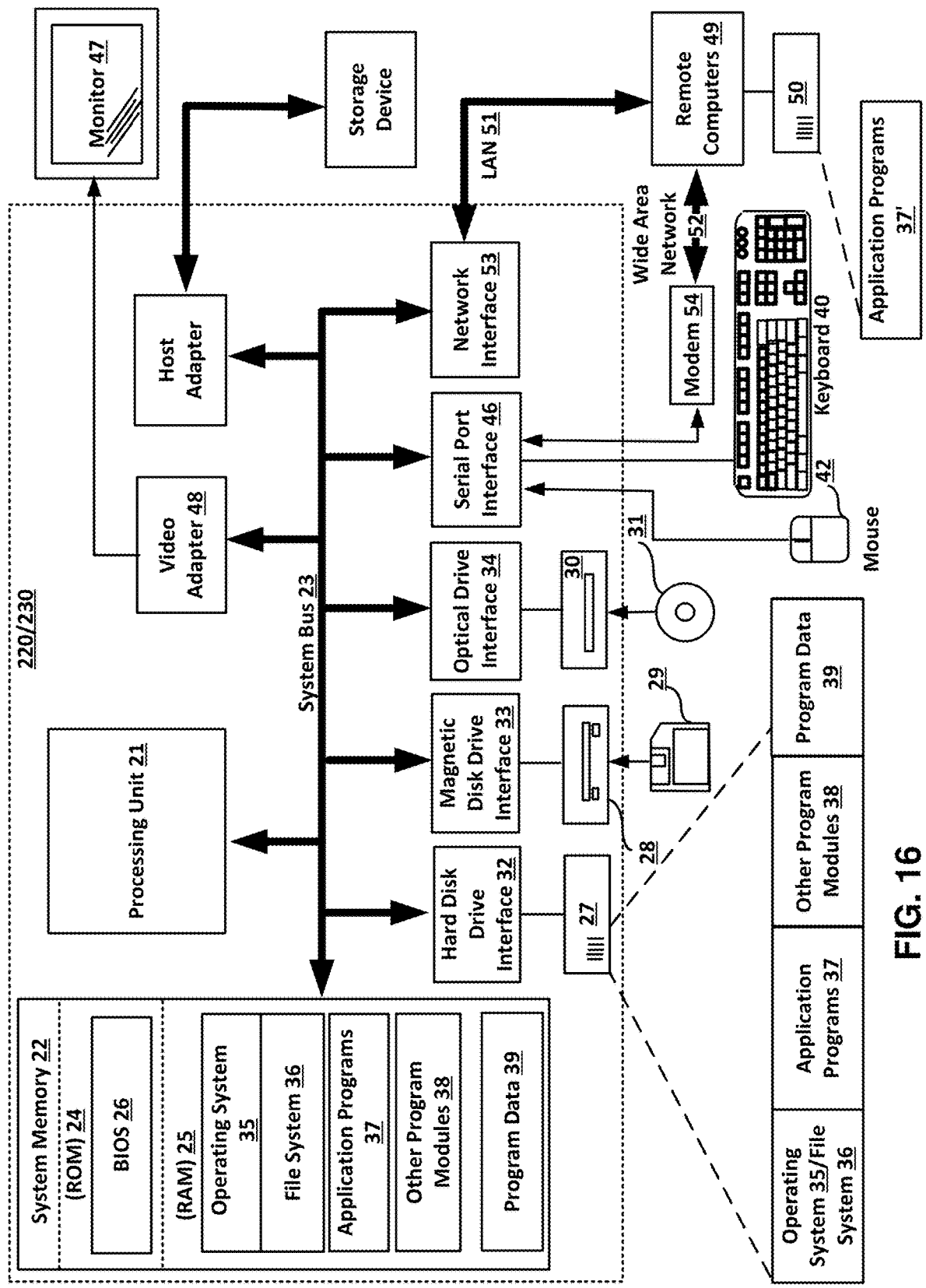
FIG. 16 illustrates a computer system or a server, which can be used in the exemplary embodiment.

With reference to FIG. 16, an exemplary system for implementing the invention includes a general purpose computing device in the form of a computer or server 220/230 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The server 220/230 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 220/230. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT Windows™ 2000). The server 220/230 includes a file system 36 associated with or included within the operating system 35, such as the Windows NT™ File System (NTFS), one or more application programs 37, other program modules 38 and program data 39. A user may enter commands and information into the server 220/230 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The server 220/230 may operate in a networked environment using logical connections to one or more remote computers 49. The remote computer (or computers) 49 may be another personal computer, a server, a router, a network PC, a peer device or other common network node, and it typically includes some or all of the elements described above relative to the server 220/230, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the server 220/230 is connected to the local network 51 through a network interface or adapter 53. When used in a WAN networking environment, the server 220/230 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the server 220/230, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method for writing objects into an object storage, the method comprising:
    on a protocol end point
        receiving a client request for inserting an object into the object storage that includes an object server and a name server, and wherein the object has an object name and object data;
        generating a unique ID (UID) for the object;
        sending, to the name server, a request for creating a guard entry (GE) in a non-persistent storage, wherein the request includes the object name and the UID,
        wherein the GE has a GE finite lifetime that defines the time during which the name-object pair with the UID should be consistently inserted into the object storage;
        sending to the object server a request for creating a Garbage Collection Entry (GCE) in a persistent storage and for assigning space for the object data in the persistent storage in the same atomic operation,
        wherein the GCE has a finite lifetime that defines a time during which the object data should be inserted into the object storage;
        sending, to the object server, the object data with a request for writing the object data to the persistent storage;
        sending, to the name server, a request for writing the object name into the persistent storage,
        wherein, upon a request from the endpoint for writing the object name into the persistent storage, the name server checks for existence of the GE and when the GE exists, the name server writes the object name into the persistent storage and deletes the GE, all in the same atomic operation;
        sending a response to the client, to report a successful object creation when all the requests to the name server and the object server were successful; and
        wherein, when GCE finite lifetime expires, the object server deletes the GCE when the object name exists on the name server, and removes the GCE and the object data in the same atomic operation when the object name does not exist on the name server.

2. The method of claim 1, wherein the object storage is a distributed key-value storage.

3. The method of claim 1, wherein the object names and the object data are stored on different servers, wherein the name server stores the object names and the object server stores the object data.

4. The method of claim 1, wherein the request for writing the object data to the persistent storage includes checking for existence of the object and writing the object data when the object exists.

5. The method of claim 1, further comprising sending a request to the object server to delete the GCE upon successful creation of the object name.

6. The method of claim 1, wherein the sending of the response to the client includes, when the object does not exist on the object server during the writing or when the GE does not exist on the name server during the name creation, a notification of failure to create the object.

7. The method of claim 1, further comprising, when the GE finite lifetime reaches zero, deleting the GE from the name server.

8. The method of claim 1, wherein, when the GCE finite lifetime expires, the object server sends a request to the name server to test existence of the object name.

9. The method of claim 1, wherein, when the object name does not exist on the name server, the GE is deleted from the name server upon sending the response to the object server request that checks for the existence of the object name.

10. The method of claim 1, further comprising checking whether the UID is in an Active Object Table upon expiration of the GE finite lifetime and either extending the GE lifetime when the UID is found in the Active Object Table, or dropping the GE when the UID is not found in the Active Object Table,
    wherein the Active Object Table represents a set of objects that have been recently written on the object server.

11. The method of claim 10, further comprising checking whether the UID is in the Active Object Table upon expiration of the GCE finite lifetime, and either extending the GCE finite lifetime if the UID is found in the Active Object Table or executing a garbage collection routine (GCR) if the UID is not found in the Active Object Table.

12. A system for writing objects into an object storage, the system comprising:
    a protocol end point, a name server and an object server, all in communication with each other;
    an object to be stored that has an object name and object data;
    the protocol end point receives a client request for inserting an object into the object storage, generates a unique ID (UID) for the object and sends to the name server, a request for creating a guard entry (GE) in a non-persistent storage, wherein the request includes the object name and the UID,
    wherein the GE has a GE finite lifetime that defines the time during which the name-object pair with the UID should be consistently inserted into the object storage;
    the protocol end point sends to an object server a request for creating a Garbage Collection Entry (GCE) in a persistent storage and for assigning space for the object data in the persistent storage in the same atomic operation,
    wherein the GCE has a GCE finite lifetime that defines a time during which the object data should be inserted into the object storage;
    the protocol end point sends, to the object server, the object data with a request for writing the object data to the persistent storage,
    wherein, upon a request from the endpoint for writing the object name into the persistent storage, the name server checks for existence of the GE and when the GE exists, the name server writes the object name into the persistent storage and deletes the GE, all in the same atomic operation;
    the protocol end point sends, to the name server, a request for writing the object name into the persistent storage;
    the protocol end point sends a response to the client, to report a successful object creation when all the requests to the name server and the object server were successful; and wherein, when GCE finite lifetime expires, the object server deletes the GCE when the object name exists on the name server, and removes the GCE and the object data in the same atomic operation when the object name does not exist on the name server.

13. The system of claim 12, wherein the object names and the object data are stored on different servers, wherein the name server stores the object names and the object server stores the object data.

14. The system of claim 12, further comprising sending a request to the object server to delete the GCE upon successful creation of the object name.

15. The system of claim 12, wherein the sending of the response to the client includes, when the object does not exist on the object server during the writing or when the GE does not exist on the name server during the name creation, a notification of failure to create the object.

16. The system of claim 12, wherein, when the GCE finite lifetime expires, the object server sends a request to the name server to test existence of the object name.

17. The system of claim 12, wherein, when the object name does not exist on the name server, the GE is deleted from the name server upon sending the response to the object server request that checks for the existence of the object name.

18. The system of claim 12, further comprising checking whether the UID is in an Active Object Table upon expiration of the GE finite lifetime and either extending the GE lifetime when the UID is found in the Active Object Table, or dropping the GE when the UID is not found in the Active Object Table,
wherein the Active Object Table represents a set of objects that have been recently written on the object server.

* * * * *